Jan. 14, 1936.　　　　　C. A. SMITH　　　　　2,028,023

ICE HANDLING TRUCK

Filed Nov. 1, 1934

Charles A. Smith
INVENTOR

BY Victor J. Evans & Co.
ATTORNEY

Patented Jan. 14, 1936

2,028,023

UNITED STATES PATENT OFFICE 2,028,023

ICE HANDLING TRUCK

Charles A. Smith, Wellsville, Kans.

Application November 1, 1934, Serial No. 751,050

1 Claim. (Cl. 280—56)

This invention relates to trucks and has for the primary object the provision of a device of this character which is especially adapted for handling ice in cake formation for moving such ice easily from one place to another and is so constructed as to support a cake of ice horizontally at a desired height from the floor or ground so as to facilitate the scoring or cutting of the ice with the use of an ice scoring device, the subject matter of a copending application, with a minimum of effort on the part of the operator, and the truck readily assumes and stands either empty or loaded in a most convenient position for use further.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a front end elevation illustrating a truck constructed in accordance with my invention.

Figure 1:
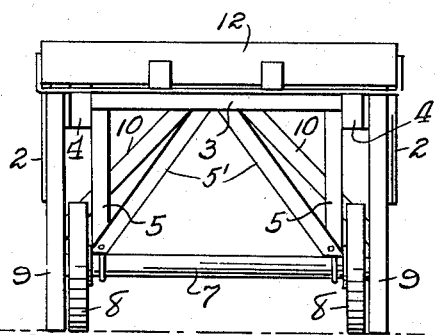
Figure 2:
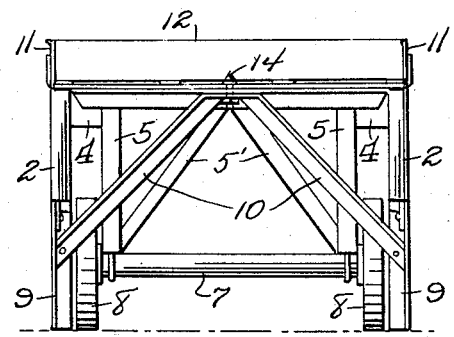
Figure 2 is a view similar to Figure 1 showing the other end of the truck.

Referring in detail to the drawing, the numeral 4 indicates a bed of a truck, consisting of side members 1 connected by an end member 3 at the forward end of the truck and also said side members are connected by transverse members 13, a pair of which project beyond said side members and are bent to provide upstanding projections 11 to prevent a block of ice from shifting sidewise from the bed. The bed further includes longitudinal members 14' secured to the transverse members 13 and the end member 3. Diagonally arranged braces 12' are arranged under the longitudinal members 14' and have the ends thereof secured to the side members. The side members at the rear of the truck terminate in handles 2.

Substantially U-shaped legs 5 are secured to the side members and include bight portions 6 arranged rearwardly of the forward end of the bed and to which an axle 7 is secured. The legs 5 are strengthened by braces 5'. Wheels 8 are journaled on the axle and supporting legs 9 are secured to the side members between the handles and the legs 5 and are braced by braces 10. The end member 12 provides a shoe which includes a transverse wall and short longitudinal walls paralleling the side members and secured to the projections 11 of one of the transverse members 13. The shoe cooperates with the projections 11 in retaining a block of ice on the bed 4 and may be employed for getting the truck under a block of ice resting on the floor or other supporting surface.

A pointed element 14 projects above the top surface of the bed to bite into the cake of ice to prevent the cake of ice sliding on the bed toward the operator when the truck is lowered to a horizontal position on an uneven floor or ground not level. This pointed element 14 co-operates with the extensions 11 and the shoe 12 in securing and holding the cake of ice on the truck in whatever position the truck may be placed. The truck must be strongly built and well braced to do the work for which it is intended, and details of construction may vary considerably from the outline here given. The essential features peculiar to this truck are the proper arrangement of the supports to bring about the results desired in handling ice and placing it in position to use the scoring device, to maintain the ice on the bed securely, and to position the scoring devices on the cake of ice resting upon said truck.

The legs 9 when brought into engagement with the floor or ground will co-operate with the wheels 8 in supporting the bed 4 in a horizontal, or level position, at a desired height to bring the top surface of the cake of ice lying on the said bed to the height correct for using the ice scoring device thereon. The location of the legs 5 on the side members 1 is such that the wheels 8 will be located to bring about a well balanced truck, that is to say that nearly all of the load will be supported by the wheels when the handles are raised for the purpose of moving the truck and its load from one place to another. Also when the handles 2 are further raised bringing the side members to an angle of approximately 50° the front or forward end of the truck comes into engagement with the floor or ground and the center of gravity of the truck whether loaded or empty falls between the wheels 8 and the front end of the truck 3, and the truck will stand in that position the most convenient position for the operator to take hold of it for further use. The handles 2 are further raised bringing the side members to a vertical position when a cake of ice is to be loaded, unloaded, or turned over to be scored on the second side.

The method of using this truck is as follows.

Figure 3:
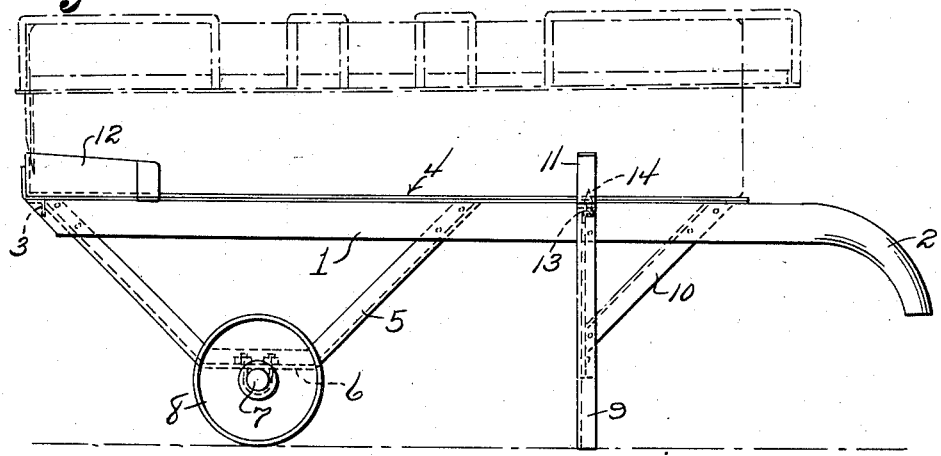
Figure 3 is a side elevation illustrating a truck supporting a cake of ice in a horizontal position ready to be scored into sections or blocks.
Figure 4:
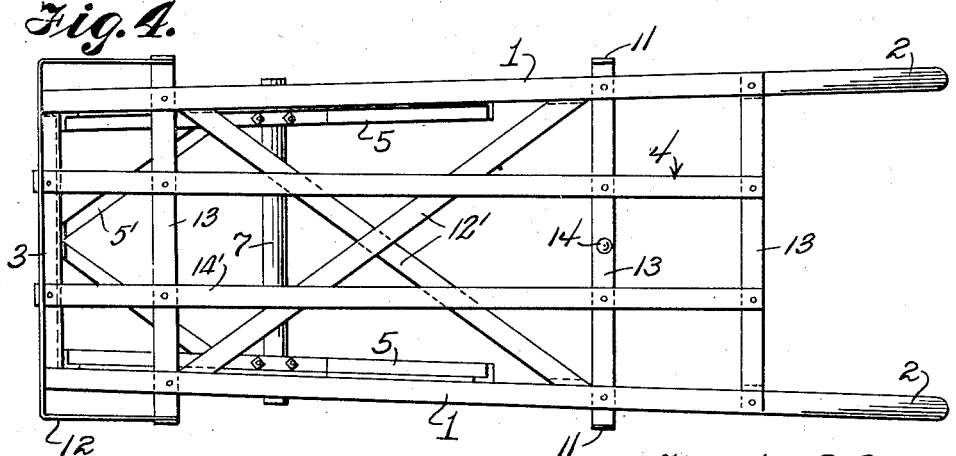
Figure 4 is a top plan view illustrating the truck.

The cakes of ice to be handled, moved or scored, are stood upon the small ends of such cakes—a common method of storing ice in ice plants and storage rooms. The truck is taken from its 50° standing position, lowered slightly to its moving position, moved to the side of the cake of ice, raised to a vertical position, the top of the cake of ice is pushed slightly from the operator who then shoves the shoe 12 under the small end of the cake of ice, the top end of which is then drawn to the truck and lowered with the truck into position to be moved wherever desired. If the ice is to be scored the handles 2 are lowered until the legs 9 rest upon the floor or ground, and while the handles are being lowered the position of the wheels 8 is such that the other end of the truck and the ice thereon is raised until the cake of ice is lying in a level position on the bed plate of the truck, as shown in Figure 3, with the top of the cake at the correct height for scoring. Select the ice scoring device that will cut the cake of ice into the weights desired, place it in position on and about the ice with the extension between the shoe 12 and the cake of ice. Use the saw to score the top side of the cake of ice, remove the scoring guides, raise the truck to its vertical position, disengage the truck from the ice, turn the cake of ice half way round, load it on the truck and lower to scoring position and score the other side of the cake of ice in a similar manner, and remove the scoring guides. The ice may then be separated into its various blocks and sold from the truck, or the truck moved elsewhere and the ice disposed of as desired, reversing the method of loading to unload it.

A truck of the character described enables one to handle and move cakes of ice with ease, and its construction is such that it is capable of withstanding the severe strains and loads for which it is designed. The legs and braces are preferably constructed of angle iron, as may also be the side rails. They may be bolted, riveted or welded together, welding being the preferable method.

This truck with the ice scoring devices and saw to be used as a complete ice handling and scoring equipment are especially adapted for use by the small ice plant operator whose space may be limited, and whose capacity does not justify the purchase, installation and operation of more expensive scoring outfits. The saving effected by this equipment will repay the investment and operating cost in a comparatively short time. The investment required is small in comparison with other equipment to do the job. And the motor required is small resulting in very small power costs, making it very economical in operation. Considerably less exertion is needed to handle this equipment than is needed to stand a cake of ice on end. Almost anyone with a little use of this equipment will perform the entire operation of scoring a cake of ice and handling it back into storage in about three minutes in ordinary situations, less time than is required to saw or pick a cake of ice into blocks for the customer with inaccurate weights and rough and uneven surfaces.

Having thus described the invention and its use, I claim:

A truck for handling blocks of ice comprising a skeleton bed including side, end, transverse and longitudinal members, said side and end members secured together at the front end of the bed and the side members terminating in handles beyond the rear end of the bed, certain of said transverse members extending beyond the side members and bent to provide upstanding projections, a shoe arranged at the front end of the bed and including a transverse wall and short longitudinal walls secured to the projections of one of the transverse members, pairs of legs secured to the side members, an axle secured to one pair of legs, wheels journaled on the axle, braces secured to the bed and to the legs and diagonally extending braces connecting the side members and engaging the under faces of the longitudinal members of the bed.

CHARLES A. SMITH.